US009448647B2

(12) United States Patent
Lim

(10) Patent No.: US 9,448,647 B2
(45) Date of Patent: Sep. 20, 2016

(54) MOBILE DEVICE AND METHOD FOR OPERATING THE SAME

(71) Applicant: Samsung Display Co., Ltd., Yongin, Gyeonggi-Do (KR)

(72) Inventor: Sang-Hyun Lim, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 111 days.

(21) Appl. No.: 14/249,101

(22) Filed: Apr. 9, 2014

(65) Prior Publication Data

US 2014/0306937 A1 Oct. 16, 2014

(30) Foreign Application Priority Data

Apr. 12, 2013 (KR) .................. 10-2013-0040183

(51) Int. Cl.
*G06F 3/043* (2006.01)
*G06F 3/0354* (2013.01)
*G06F 3/041* (2006.01)
*G06F 3/16* (2006.01)

(52) U.S. Cl.
CPC ......... *G06F 3/03547* (2013.01); *G06F 3/0416* (2013.01); *G06F 3/167* (2013.01); *G06F 2203/04105* (2013.01); *G06F 2203/04106* (2013.01)

(58) Field of Classification Search
None
See application file for complete search history.

(56) References Cited

U.S. PATENT DOCUMENTS

| 2009/0008160 A1* | 1/2009 | Aroyan ................. G06F 3/0436 178/18.01 |
| 2009/0009488 A1* | 1/2009 | D'Souza ............... G06F 3/0436 345/177 |
| 2011/0084940 A1 | 4/2011 | Lee |
| 2014/0023210 A1* | 1/2014 | Sheng ..................... H04R 3/00 381/114 |
| 2014/0160010 A1* | 6/2014 | Jung ..................... G06F 3/0414 345/156 |

FOREIGN PATENT DOCUMENTS

| KR | 10-2010-0128265 A | 12/2010 |
| KR | 10-2011-0038794 A | 4/2011 |
| KR | 10-2012-0115636 A | 10/2012 |

* cited by examiner

Primary Examiner — Adam R Giesy
(74) Attorney, Agent, or Firm — Knobbe, Martens, Olson & Bear LLP

(57) ABSTRACT

A mobile device configured to measure a touch pressure of a touch input made by a user to a touch screen display panel using a sound generated by the touch input, and a method of using the same, are disclosed. In one aspect, the mobile device includes a touch screen display panel configured to sense a touch input made by a user to the touch screen panel and output a coordinate value of the sensed touch input. The mobile device additionally includes a voice recognition device configured to sense a touch sound signal generated by the touch input. The mobile device further includes a touch pressure sensing unit configured to determine a touch pressure of the touch input based on the coordinate value and a sound level of the touch sound signal.

14 Claims, 3 Drawing Sheets

MOBILE DEVICE AND METHOD FOR OPERATING THE SAME

RELATED APPLICATIONS

This application claims priority to and the benefit of Korean Patent Application No. 10-2013-0040183, filed on Apr. 12, 2013, in the Korean Intellectual Property Office, the entire contents of which are incorporated herein by reference in their entirety.

BACKGROUND

1. Field of the Technology

The disclosed technology relates generally to mobile devices, and more particularly to a mobile device having a touch screen display panel configured to measure pressure of a touch input made by a user to a touch screen display panel using the sound generated by the touch input.

2. Description of the Related Technology

There has been a steady trend towards miniaturization of mobile devices, e.g., a personal digital assistant (PDA), an MP3 player, a portable multimedia player (PMP), an automotive navigation system, a mobile Internet device (MID), etc.

In addition, many recent mobile devices have touch screen displays that are configured to receive a user's input through a touch screen display panel. In some devices, such touch screen devices constitute a primary means by which a user inputs data into the device. In particular, these devices are configured to sense coordinates of a user's touch input made to the touch screen panel, and to perform an operation corresponding to the data or the command input made through the sensed coordinates.

In addition to the touch inputs including the sensed coordinates and the corresponding data or command input made by a user, the user may additionally wish to differentiate the levels of pressure at which the touch inputs have been made. Thus, there is a need for a mobile device having a touch screen display configured to sense the touch pressure of the user's touch input.

SUMMARY OF CERTAIN INVENTIVE ASPECTS

Embodiments provide a mobile device and a method for operating the same, which can measure a touch pressure of a touch input applied to a display, using a touch screen panel and a voice recognition device.

In one aspect, a mobile device includes a touch screen display panel configured to sense a touch input made by a user to the touch screen panel and output a coordinate value of the sensed touch input. The mobile device additionally includes a voice recognition device configured to sense a touch sound signal generated by the touch input. The mobile device further includes a touch pressure sensing unit configured to determine a touch pressure of the touch input based on the coordinate value and a sound level of the touch sound signal.

The touch pressure sensing unit may include a band pass filter configured to extract a signal in a frequency band corresponding to the touch input from the sound signal and output the extracted signal as a touch sound signal; and a touch pressure calculating unit configured to calculate the touch pressure of the touch input, based on the coordinate value and the sound level of the sound signal.

The touch pressure sensing unit may read reference sound levels corresponding to the coordinate value from a memory, and calculate the touch pressure of the touch input by comparing the reference sound levels with the sound level of the sound signal.

The touch pressure sensing unit may read first reference sound levels corresponding to corners of the display from a memory, calculate second reference sound levels corresponding to the coordinate value from the first reference sound levels, using a bilinear interpolation technique, and calculate the touch pressure of the touch input by comparing the second reference sound levels with the sound level of the sound signal.

The touch pressure sensing unit may store sound levels sensed by the voice recognition device as the first reference sound levels in the memory when the corners of the display are touched with a first reference pressure and a second reference pressure.

According to another aspect, a method for operating a mobile device includes sensing coordinates of a touch input to a touch screen display panel. The method additionally includes sensing a touch sound signal generated by the touch input. The method further includes determining a touch pressure of the touch input based on the sensed coordinates and a sound level of the sensed touch sound signal.

The sensing of the sound signal may include sensing a sound signal; and extracting a signal in a frequency band corresponding to the touch input as the touch sound signal from the sensed sound signal.

The calculating of the touch pressure of the touch input may include reading reference sound levels corresponding to the coordinate value of the sensed coordinates from a memory; and calculating the touch pressure of the touch input by comparing the reference sound levels with the sound level of the sound signal.

The calculating of the touch pressure of the touch input may include reading first reference sound levels respectively corresponding to corners of the display from a memory; calculating second reference sound levels corresponding to the coordinate value of the sensed coordinates from the first reference sound levels, using a bilinear interpolation technique; and calculating the touch pressure of the touch input by comparing the second reference sound levels with the sound level of the sound signal.

The method may further include storing sound levels of a sound signal sensed when the corners of the display are touched with a first reference pressure and a second reference pressure as the first reference sound levels in the memory.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Hereinafter, certain exemplary embodiments according to the present invention will be described in detail with reference to the accompanying drawings.

Figure 1:
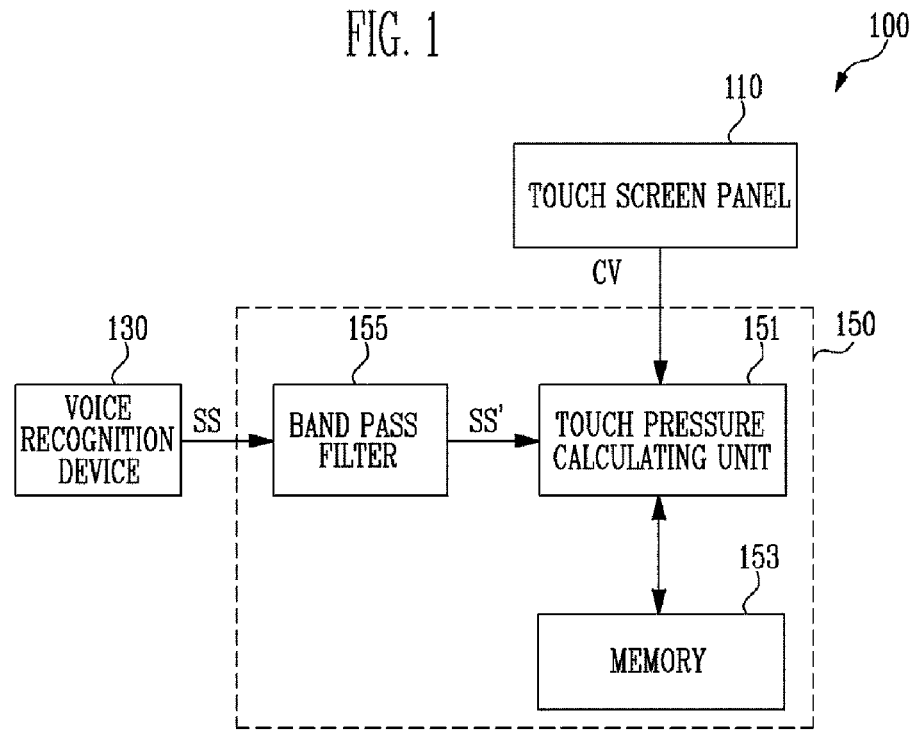
FIG. 1 is a block diagram illustrating a mobile device according to an embodiment.

FIG. 1 is a block diagram illustrating a mobile device according to an embodiment.

Referring to FIG. 1, the mobile device 100 includes a touch screen panel 110, a voice recognition device 130 and a touch pressure sensing unit 150.

The mobile device 100 includes all devices each having a display, such as a personal digital assistant (PDA), a cellular phone, a smart phone, an MP3 player, a portable multimedia player (PMP), an automotive navigation system and a mobile Internet device (MID).

The touch screen panel 110 senses a touch input when the touch input is applied to a display and outputs the coordinate value CV of the sensed touch input to the touch pressure sensing unit 150.

The voice recognition device 130 senses a sound signal SS around the mobile device 100, and outputs the sensed sound signal SS to the touch pressure sensing unit 150. The voice recognition device 130 may be a microphone, but the technical spirit of the present invention is not limited thereto.

The touch pressure sensing unit 150 receives the coordinate value CV of the touch input from the touch screen panel 110 and receives the sound signal SS from the voice recognition device 130. The touch pressure sensing unit 150 calculates a touch pressure of the touch input, based on the coordinate value CV of the touch input and the sound level of the sound signal SS.

The touch pressure sensing unit 150 includes a touch pressure calculating unit 151 and a memory 153.

The touch pressure calculating unit 151 calculates a touch pressure corresponding to the coordinate value CV of the touch input and the sound level of the sound signal SS, with reference to data stored in the memory 153.

According to a first embodiment, the touch pressure calculating unit 151 reads reference sound levels corresponding to the coordinate value CV of the touch input from the memory 153, and calculates the touch pressure of the touch input by comparing the read reference sound levels with the sound level of the sound signal SS.

The method in which the touch pressure calculating unit 151 calculates the touch pressure of the touch input according to the first embodiment will be described in detail with reference to FIG. 4.

According to a second embodiment, the touch pressure calculating unit 151 reads first reference sound levels corresponding to corners of the display from the memory 153, calculates second reference sound levels corresponding to the coordinate value CV of the touch input, based on the read first reference sound levels, and calculates the touch pressure of the touch input by comparing the calculated second reference sound levels with the sound level of the sound signal SS.

The method in which the touch pressure calculating unit 151 calculates the touch pressure of the touch input according to the second embodiment will be described in detail with reference to FIG. 5.

The memory 153 stores reference sound levels corresponding to the entire area of the display or stores first reference sound levels corresponding to the corners of the display.

Specifically, the memory 153 stores reference sound levels corresponding to the entire area of the display according to the first embodiment, or stores first reference sound levels corresponding to the corners of the display according to the second embodiment.

In the second embodiment, the process of storing the first reference sound levels in the memory 153 will be described in detail with reference to FIG. 3.

The touch pressure sensing unit 150 may further include a band pass filter 155.

The band pass filter 155 receives a sound signal SS output from the voice recognition device 130, extracts a touch sound signal SS' generated by the touch input from the received sound signal SS, and outputs the extracted touch sound signal SS' to the touch pressure calculating unit 151.

Specifically, the band pass filter 155 extracts a signal in a frequency band corresponding to the touch input from the sound signal SS and outputs the extracted signal as the touch sound signal SS' to the touch pressure calculating unit 151. The frequency band may be determined by a designer, based on the structure of the mobile device.

Noises are removed by the band pass filter 155, so that the touch pressure calculating unit 151 can more precisely calculate the touch pressure of the touch input.

Figure 2:
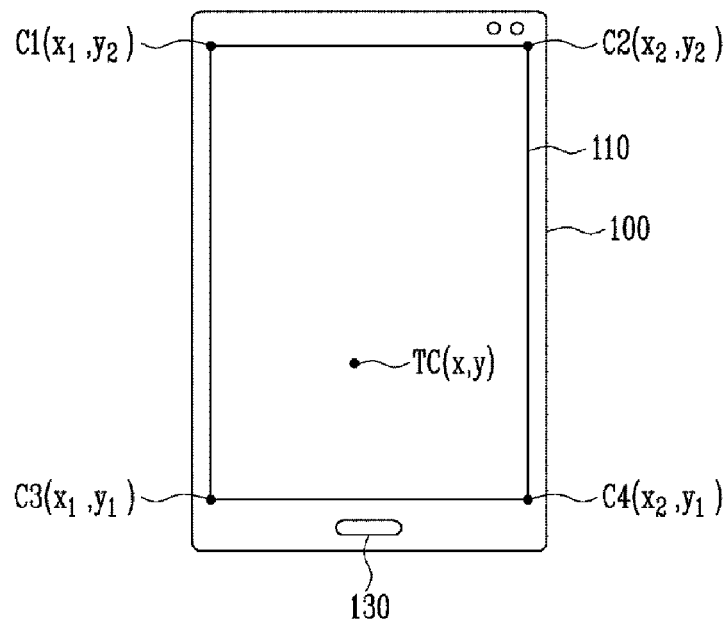
FIG. 2 is a conceptual view illustrating a method for operating the mobile device shown in FIG. 1.

FIG. 2 is a conceptual view illustrating a method for operating the mobile device shown in FIG. 1. FIG. 3 is a flowchart illustrating a method in which the touch pressure sensing unit shown in FIG. 1 stores first reference sound levels in the memory.

Figure 3:
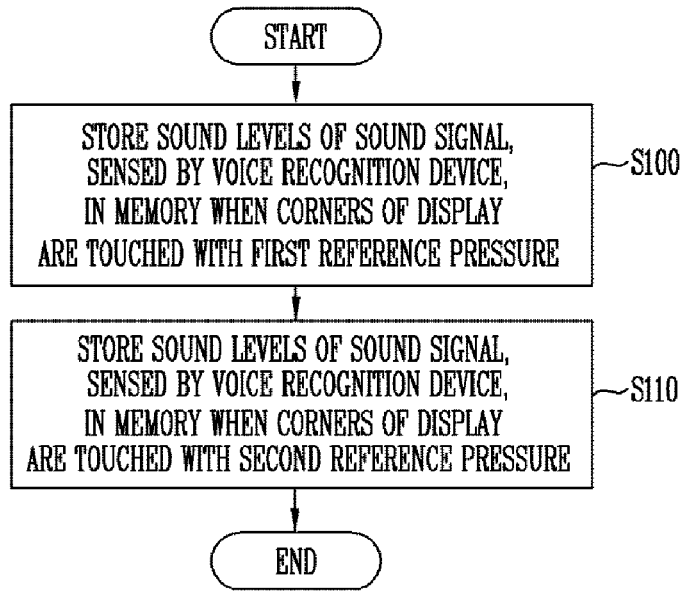
FIG. 3 is a flowchart illustrating a method in which a touch pressure sensing unit shown in FIG. 1 stores first reference sound levels in a memory.

Referring to FIGS. 2 and 3, when corners C1 to C4 of the display are touched with a first reference pressure, the touch pressure sensing unit 150 receives a sound signal SS. The touch pressure sensing unit 150 stores sound levels of the received sound signal SS as first reference sound levels RLL11 to RLL14 in the memory 153 included in the touch pressure sensing unit 150 (S100).

When the corners C1 to C4 of the display are touched with a second reference pressure, the touch pressure sensing unit 150 receives a sound signal SS. The touch pressure sensing unit 150 stores sound levels of the received sound signal SS as first reference sound levels RLL21 to RLL24 in the memory 153 included in the pressure sensing unit 150 (S110).

Accordingly, the eight first reference sound levels RLL11 to RLL14 and RLL21 to RLL24 are stored in the memory 153.

Figure 4:
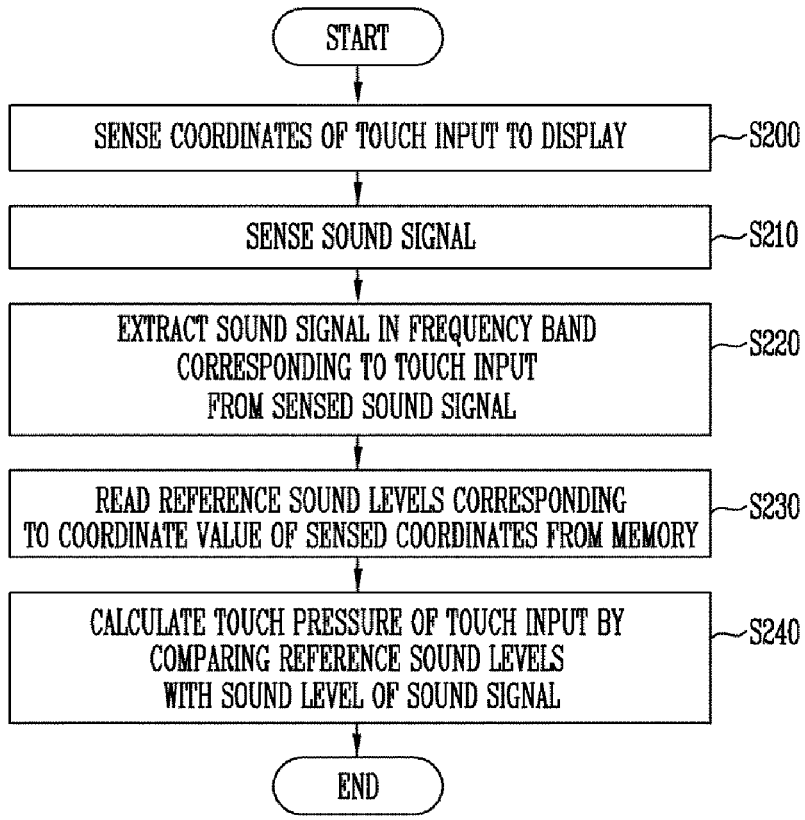
FIG. 4 is a flowchart illustrating an embodiment of a method in which the touch pressure sensing unit shown in FIG. 1 senses the touch pressure of a touch input.

FIG. 4 is a flowchart illustrating a first embodiment of the method in which the touch pressure sensing unit shown in FIG. 1 senses the touch pressure of the touch input.

Referring to FIGS. 2 and 4, when a touch input is applied to the display, the touch screen panel 110 senses coordinates of the applied touch input and outputs the coordinate value CV of the sensed coordinates to the touch pressure calculating unit 151 (S200). The voice recognition device 130 senses a sound signal SS and outputs the sensed sound signal SS to the band pass filter 155 (S210).

The band pass filter 155 extracts a signal in a frequency band corresponding to the touch input from the sensed sound signal SS and outputs the extracted signal as a touch sound signal SS' to the touch pressure calculating unit 151 (S220).

The touch pressure calculating unit 151 reads reference sound levels RLL1 and RLL2 corresponding to the coordinate value CV from the memory 153 (S230), and calculates a touch pressure of the touch input by comparing the read reference sound levels with the sound level of the touch sound signal SS' (S240).

Here, the reference sound level RLL1 corresponds to a first reference pressure RTP1, and the reference sound level RLL2 corresponds to a second reference pressure RTP2.

For example, when assuming that the touch pressure of the touch input is in proportion to the sound level of a sound generated by the touch input, the touch pressure calculating unit 151 may calculate the touch pressure TP of the touch input as shown in the following Equation 1.

$$TP = RTP1 + \frac{RTP2 - RTP1}{RLL2 - RLL1}(LL - RLL1) \quad \text{Equation 1}$$

Here, LL denotes a sound level of the sound signal SS or touch sound signal SS'.

Only the method has been described, in which when the touch pressure of the touch input is in proportion to the sound level of the sound generated by the touch input, the touch pressure calculating unit 151 calculates the touch pressure TP of the touch input. However, the technical spirit of the present invention is not limited thereto.

Figure 5:
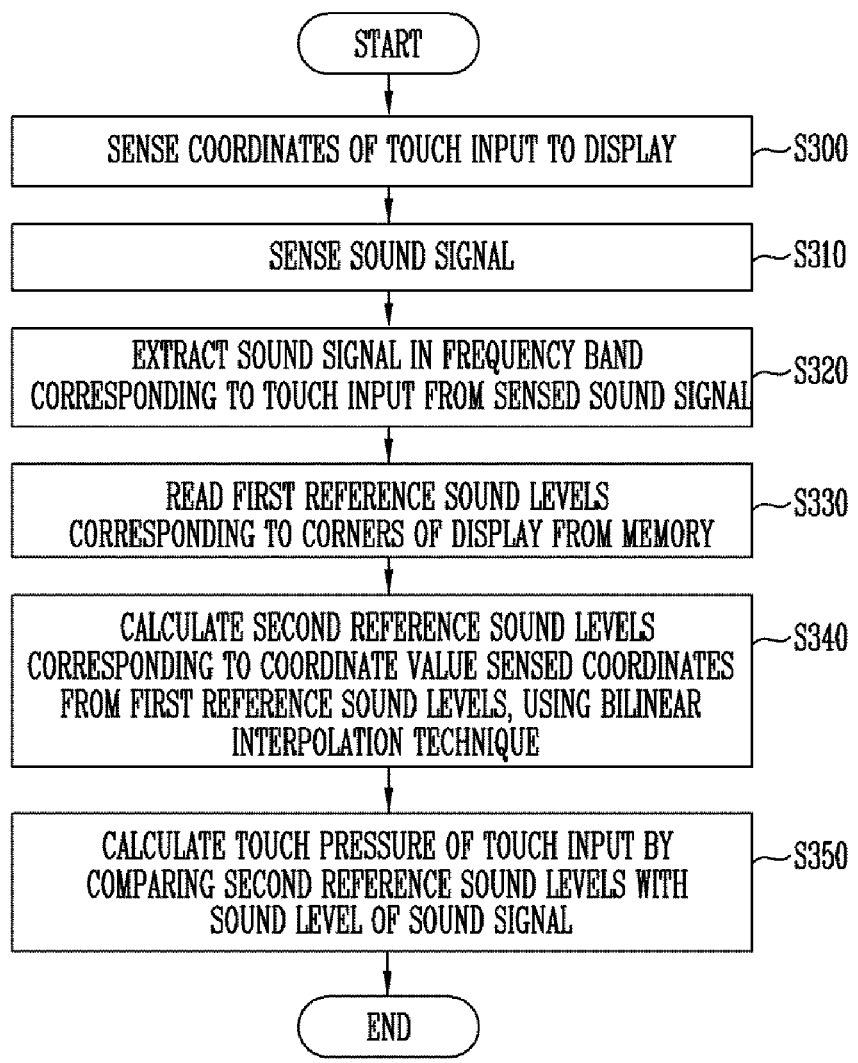
FIG. 5 is a flowchart illustrating another embodiment of the method in which the touch pressure sensing unit shown in FIG. 1 senses the touch pressure of the touch input.

FIG. 5 is a flowchart illustrating a second embodiment of the method in which the touch pressure sensing unit shown in FIG. 1 senses the touch pressure of the touch input.

Referring to FIGS. 2 and 5, when a touch input is applied to the display, e.g., when the touch input is applied to a touch point TP, the touch screen panel 110 senses coordinates of the touch point TP and outputs the coordinate value CV of the sensed coordinates to the touch pressure calculation unit 151 (S300). The voice recognition device 130 senses a sound signal SS and outputs the sensed sound signal SS to the band pass filter 155 (S310).

The band pass filter 155 extracts a signal in a frequency band corresponding to the touch input from the sensed sound signal SS and outputs the extracted signal as a touch sound signal SS' to the touch pressure calculating unit 151 (S320).

The touch pressure calculating unit 151 reads first reference sound levels RLL11 to RLL14 and RLL21 to RLL24 corresponding to the respective corners C1 to C4 of the display from the memory 153 (S330), and calculates second reference sound levels RLL1' and RLL2' corresponding to the coordinate value CV of the touch point TP from the read first reference sound levels, using a bilinear interpolation technique (S340).

Here, the first reference sound levels RLL11 to RLL14 correspond to a first reference pressure RTP1, and the first reference sound levels RLL21 to RLL24 correspond to a second reference pressure RTP2. The second reference level RLL1' corresponds to the first reference pressure RTP1, and the second reference level RLL2' corresponds to the second reference pressure RTP2.

For example, the touch pressure calculating unit 151 may calculate the second reference sound levels RLL1' and RLL2' as shown in the following Equations 2 and 3.

$$RLL1' = \frac{RLL11}{(x_2 - x_1)(y_2 - y_1)}(x_2 - x)(y - y_1) + \quad \text{Equation 2}$$
$$\frac{RLL12}{(x_2 - x_1)(y_2 - y_1)}(x - x_1)(y - y_1) +$$
$$\frac{RLL13}{(x_2 - x_1)(y_2 - y_1)}(x_2 - x)(y_2 - y) +$$
$$\frac{RLL14}{(x_2 - x_1)(y_2 - y_1)}(x - x_1)(y_2 - y)$$

$$RLL2' = \frac{RLL21}{(x_2 - x_1)(y_2 - y_1)}(x_2 - x)(y - y_1) + \quad \text{Equation 3}$$
$$\frac{RLL22}{(x_2 - x_1)(y_2 - y_1)}(x - x_1)(y - y_1) +$$
$$\frac{RLL23}{(x_2 - x_1)(y_2 - y_1)}(x_2 - x)(y_2 - y) +$$
$$\frac{RLL24}{(x_2 - x_1)(y_2 - y_1)}(x - x_1)(y_2 - y)$$

Here, RLL11 denotes a first reference sound level corresponding to the first reference pressure applied to the first corner C1, RLL12 denotes a first reference sound level corresponding to the first reference pressure applied to the second corner C2, RLL13 denotes a first reference sound level corresponding to the first reference pressure applied to the third corner C3, and RLL14 denotes a first reference sound level corresponding to the first reference pressure applied to the fourth corner C4.

RLL21 denotes a first reference sound level corresponding to the second reference pressure applied to the first corner C1, RLL22 denotes a first reference sound level corresponding to the second reference pressure applied to the second corner C2, RLL23 denotes a first reference sound level corresponding to the second reference input applied to the third corner C3, and RLL24 denotes a first reference sound level corresponding to the second reference pressure applied to the fourth corner C4.

The touch pressure calculating unit 151 calculates the touch pressure of the touch input to the touch point TP by comparing the calculated second reference sound levels RLL1' and RLL2' with the sound level of the touch sound signal SS' (S350).

For example, when assuming that the touch pressure of the touch input is in proportion to the sound level of a sound generated by the touch input, the touch pressure calculating unit 151 may calculate the touch pressure TP of the touch input as shown in the following Equation 4.

$$TP = RTP1 + \frac{RTP2 - RTP1}{RLL2' - RLL1'}(LL - RLL1') \quad \text{Equation 4}$$

Here, RTP1 denotes a first reference pressure, RTP2 denotes a second reference pressure, and LL denotes a sound level of the sound signal SS or touch sound signal SS'.

The sound level of a sound generated by a touch input and the coordinates of the touch input may not be linear due to various components included in the mobile device 100. Thus, the touch pressure sensing unit 150 stores reference sound levels corresponding to the first reference pressure RTP1 and the second reference pressure RTP2 at the central portion of the display, and controls the calculated touch pressure TP, based on the stored reference sound levels, thereby more precisely sensing the touch pressure TP of the touch input.

By way of summation and review, there is known a mobile device or the like, which senses a touch pressure of a touch input through an additional device such as a pressure sensor formed in a touch screen panel. Thus, a mobile device having no additional device cannot sense a touch pressure of a touch input. In a case where a mobile device includes the additional device, the manufacturing cost of the mobile device may be increased.

In the mobile device and the method for operating the same according to the present invention, it is possible to sense a touch pressure of a touch input applied to the display, using the touch screen panel and the voice recognition device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A mobile device, comprising:
  a touch screen display panel configured to sense a touch input made by a user to the touch screen display panel and output a coordinate value of the sensed touch input;
  a voice recognition device configured to sense a touch sound signal generated by the touch input; and
  a touch pressure sensing unit configured to determine a touch pressure of the touch input based on the coordinate value and a sound level of the touch sound signal, the touch pressure sensing unit comprising:
    a band pass filter configured to receive a sound signal from the voice recognition device and remove noise signals therefrom by extracting from the sound signal the touch sound signal having a frequency within a touch sound frequency band corresponding to the touch input, the band pass filter further configured to output the touch sound signal, and
    a touch pressure calculating unit configured receive the coordinate value from the touch screen display panel and to receive the touch sound signal from the band pass filter, and further configured to calculate the touch pressure of the touch input based on the coordinate value and the touch sound signal.

2. The mobile device of claim 1, wherein the touch pressure sensing unit is configured to read a plurality of reference sound levels corresponding to the coordinate value from a memory, the reference sound levels having sound levels different from the sound level of the touch sound signal, and further configured to calculate the touch pressure of the touch input by comparing the reference sound levels with the sound level of the touch sound signal.

3. The mobile device of claim 2, wherein the reference sound levels include a first reference sound level corresponding to a first reference touch pressure and a second reference sound level corresponding to a second reference touch pressure different from the first reference touch pressure.

4. The mobile device of claim 3, wherein the touch pressure sensing unit is configured to calculate the touch pressure based on a proportional relationship between a first ratio and a second ratio, wherein the first ratio is between the difference of the touch pressure and the first reference touch pressure and the difference of the touch sound level and the first reference sound level, and wherein the second ratio is between the difference of the first reference touch pressure and the second reference touch pressure and the difference of the first reference sound level and the second reference sound level.

5. The mobile device of claim 4, wherein the proportional relationship is linear.

6. The mobile device of claim 1, wherein the touch pressure sensing unit is configured to read first reference sound levels corresponding to corners of the touch screen display panel from a memory, and configured to calculate second reference sound levels corresponding to the coordinate value from the first reference sound levels using a bilinear interpolation technique, and further configured to calculate the touch pressure of the touch input by comparing the second reference sound levels with the sound level of the touch sound signal.

7. A mobile device, comprising:
  a touch screen display panel configured to sense a touch input made by a user to the touch screen display panel and output a coordinate value of the sensed touch input;
  a voice recognition device configured to sense a touch sound signal generated by the touch input; and
  a touch pressure sensing unit configured to:
    determine a touch pressure of the touch input based on the coordinate value and a sound level of the touch sound signal,
    read first reference sound levels corresponding to corners of the touch screen display panel from a memory, and configured to calculate second reference sound levels corresponding to the coordinate value from the first reference sound levels using a bilinear interpolation technique, and further configured to calculate the touch pressure of the touch input by comparing the second reference sound levels with the sound level of the touch sound signal, and
    store sound levels sensed by the voice recognition device as the first reference sound levels in the memory when the corners of the display are touched with a first reference pressure and a second reference pressure.

8. A method for operating a mobile device, the method comprising:
  sensing coordinates of a touch input to a touch screen display panel;
  sensing a touch sound signal generated by the touch input, the sensing the touch sound signal comprising:
    sensing a sound signal, and
    removing noise signals from the sound signal by extracting from the signal the touch sound signal having a frequency within a touch sound frequency band corresponding to the touch input; and
  determining a touch pressure of the touch input based on the sensed coordinates and a sound level of the sensed touch sound signal.

9. The method of claim 8, wherein the calculating of the touch pressure of the touch input comprises:
  reading a plurality of reference sound levels corresponding to a coordinate value of the sensed coordinates from a memory, the reference sound levels having sound levels different from the sound level of the touch sound signal; and calculating the touch pressure by comparing the reference sound levels with the sound level of the touch sound signal.

10. The method of claim 9, wherein the reference sound levels include a first reference sound level corresponding to a first reference touch pressure and a second reference sound level corresponding to a second reference touch pressure different from the first reference touch pressure.

11. The method of claim 10, wherein calculating the touch pressure includes calculating based on a proportional relationship between a first ratio and a second ratio, wherein the first ratio is between the difference of the touch pressure and the first reference touch pressure and the difference of the touch sound level and the first reference sound level, and wherein the second ratio is between the difference of the first reference touch pressure and the second reference touch pressure and the difference of the first reference sound level and the second reference sound level.

12. The mobile device of claim 11, wherein the proportional relationship is linear.

13. The method of claim 8, wherein the calculating of the touch pressure of the touch input comprises:
reading first reference sound levels respectively corresponding to corners of the display from a memory;
calculating second reference sound levels corresponding to a coordinate value of the sensed coordinates from the first reference sound levels, using a bilinear interpolation technique; and
calculating the touch pressure by comparing the second reference sound levels with the sound level of the sound signal.

14. The method of claim 13, further comprising storing sound levels of a sound signal sensed when the corners of the display are touched with a first reference pressure and a second reference pressure as the first reference sound levels in the memory.

* * * * *